US012744266B2

(12) United States Patent
Takahashi et al.

(10) Patent No.: US 12,744,266 B2
(45) Date of Patent: Sep. 22, 2026

(54) LIQUID DETECTION SENSOR

(71) Applicant: FUJIKURA COMPOSITES Inc., Tokyo (JP)

(72) Inventors: Masaki Takahashi, Saitama (JP); Masahiro Seshimo, Saitama (JP)

(73) Assignee: FUJIKURA COMPOSITES INC, Tokyo (JP)

( * ) Notice: Subject to any disclaimer, the term of this patent is extended or adjusted under 35 U.S.C. 154(b) by 366 days.

(21) Appl. No.: 17/929,822

(22) Filed: Sep. 6, 2022

(65) Prior Publication Data

US 2023/0006285 A1 Jan. 5, 2023

Related U.S. Application Data

(63) Continuation of application No. PCT/JP2021/011017, filed on Mar. 18, 2021.

(30) Foreign Application Priority Data

Apr. 15, 2020 (JP) ................................ 2020-073000

(51) Int. Cl.
*H01M 12/02* (2006.01)
*H01M 12/06* (2006.01)

(52) U.S. Cl.
CPC .......... *H01M 12/02* (2013.01); *H01M 12/06* (2013.01)

(58) Field of Classification Search
CPC ............................. H01M 12/02; H01M 12/06
See application file for complete search history.

(56) References Cited

U.S. PATENT DOCUMENTS 3,532,555 A * 10/1970 Hamlen .................. H01M 6/38 429/116
5,399,444 A 3/1995 Smith
(Continued)

FOREIGN PATENT DOCUMENTS

CN 102308414 A 1/2012
CN 103718336 A 4/2014
(Continued)

OTHER PUBLICATIONS

JP2013181955A translation (Year: 2013).*
(Continued)

*Primary Examiner* — Helen Oi K Conley
*Assistant Examiner* — Amanda Rosenbaum
(74) *Attorney, Agent, or Firm* — Chrisman Gallo Tochtrop LLC

(57) ABSTRACT

The present disclosure provides a liquid detection sensor which has the general purpose usability and can prevent the deterioration of a metal-air battery being an electric power source even when being installed for a long term, and in which the metal-air battery being an electric power source can exhibit an excellent electric power generation performance. The liquid detection sensor has the metal-air battery having a positive electrode, a negative electrode, and an electrolytic solution-forming component positioned between the positive electrode and the negative electrode, wherein the electrolytic solution-forming component is enclosed in the inside of a resin-made bag; and a resin of the resin-made bag has dissolvability or dispersibility in a liquid being an object to be detected.

12 Claims, 6 Drawing Sheets

(56) References Cited

U.S. PATENT DOCUMENTS

| | | | | |
|---|---|---|---|---|
| 2007/0015048 | A1* | 1/2007 | Lee | H01M 10/0525 429/118 |
| 2010/0203394 | A1* | 8/2010 | Bae | H01M 50/489 429/246 |
| 2013/0211329 | A1 | 8/2013 | Kamatani et al. | |
| 2014/0120402 | A1* | 5/2014 | Yu | H01M 50/446 429/144 |
| 2015/0064568 | A1* | 3/2015 | Yushin | H01M 10/0525 429/233 |
| 2015/0118582 | A1 | 4/2015 | Badding et al. | |
| 2020/0395610 | A1 | 12/2020 | Ono et al. | |

FOREIGN PATENT DOCUMENTS

| | | | | |
|---|---|---|---|---|
| CN | 108140920 | A | | 6/2018 |
| CN | 109845006 | A | | 6/2019 |
| JP | 52-161215 | U | | 5/1977 |
| JP | 2012-517075 | A | | 7/2012 |
| JP | 2013181955 | A | * | 9/2013 |
| JP | 2016009533 | A | * | 1/2016 |
| JP | 2017-148332 | A | | 8/2017 |
| TW | 201526372 | A | | 7/2015 |
| WO | 2012/020507 | A1 | | 2/2012 |
| WO | 2018/092773 | A1 | | 5/2018 |

OTHER PUBLICATIONS

International Search Report for corresponding International Application No. PCT/JP2021/011017 mailed Jun. 8, 2021.

Written Opinion for corresponding International Application No. PCT/JP2021/011017 dated Jun. 8, 2021.

First Office Action dated Feb. 6, 2025 for corresponding Japanese Application No. 2022-515261 and English translation.

First Office Action dated Feb. 11, 2025 for corresponding Taiwanese Application No. 110112532 and English translation.

Office Action dated Aug. 12, 2025 in the corresponding TW application No. 110112532.

First Office Action dated Jun. 18, 2025 for corresponding Korean Application No. 10-2022-7028575 and English translation.

Notice of Final Rejection in the corresponding KR application No. 10-2022-7028575 Mar. 24, 2026.

First Office Action dated Dec. 3, 2025 for corresponding Chinese Application No. 202180020827.7 and English translation.

Second Office Action in the corresponding CN application No. 202180020827.7 Aug. 2, 2026.

* cited by examiner 2
10
11
12
13
14
14
30
31
100
101

LIQUID DETECTION SENSOR

CROSS REFERENCE TO RELATED APPLICATIONS

The present application is a continuation application of International Patent Application No. PCT/JP2021/011017 filed on Mar. 18, 2021, which claims the benefit of Japanese Patent Application No. 2020-073000, filed on Apr. 15, 2020. The contents of these applications are incorporated herein by reference in their entirety.

BACKGROUND

Technical Field

The present disclosure relates to a liquid detection sensor having a metal-air battery, and particularly relates to a liquid detection sensor having excellent electric power generation performance and being excellent in long-term storage performance.

Background

Liquid detection sensors, which detect liquid leakage and water flooding, are sometimes used in buildings, underground facilities, factories, medical sites and the like. The liquid detection sensors are disposed in places where liquid leakage and water flooding have to be prevented. The liquid detection sensors detect electrical changes generated when contacting a liquid from the outside, thereby detecting liquid leakage.

As a liquid detection sensor, there is, for example, a liquid detection sensor for medical sites having a water battery which generates electric power by a liquid having leaked out (International Publication No. WO2012/020507). In International Publication No. WO2012/020507, the water battery is fixed on an absorbing member with a fixing tape having tackiness, and a liquid such as blood or a drip solution absorbed and diffused in the absorbing member being supplied to a whole water battery causes the water battery to generate electric power and detect liquid leakage.

Also, as a liquid detection sensor, there is, for example, a liquid detection sensor for medical sites having a liquid leakage sensor section composed of a magnesium battery (Japanese Patent Application Publication Laid-Open No. 2017-148332). In Japanese Patent Application Publication Laid-Open No. 2017-148332, the magnesium battery is one in which a positive electrode sheet, a catalyst sheet, a sheet-form separator and a negative electrode sheet are laminated in order; and the liquid detection sensor has a signal transmitting unit that is electrically connected to the liquid leakage sensor section and transmits a detection signal by electric power of the magnesium battery, and a signal receiving terminal having a signal receiving unit that receives the detection signal transmitted from the signal transmitting unit and alarm means that issues an alarm about a liquid leakage state based on the detection signal from the signal transmitting unit.

The liquid leakage sensor section detects, as a liquid leakage state, the state in which the magnesium battery using, as an electrolytic solution, blood or an injection solution having leaked from an injection needle generates electric power.

The liquid leakage has to be detected precisely; however, in the liquid detection sensors of Patent Literatures 1 and 2, in which blood or the like being an object to be detected functions as an electrolytic solution, no proposal is specially made except for detection of blood and the like in medical sites as liquid objects to be detected.

Meanwhile, the detection of liquid leakage and water flooding is demanded not only in medical sites but also in wide-ranging fields such as buildings, underground facilities and factories, and liquid detection sensors may be required to exhibit general purpose usability including detection of water or oil. The liquid detection sensors of Patent Literatures 1 and 2, however, are poor in the general purpose usability as described above.

With regard to imparting a liquid detection sensor with the general purpose usability, when liquid leakage and water flooding in a building, an underground facility, a factory or the like is monitored by using the liquid detection sensor, a monitor monitors the liquid leakage and water flooding at a place at some distance from the site of the liquid leakage and water flooding. In order for the liquid detection sensor to securely transmit an alarm signal to the place at some distance from the site of liquid leakage and water flooding, the electric power generation performance of a battery mounted in the liquid detection sensor needs to be improved.

When a metal-air battery is used as an electric power source mounted in a liquid detection sensor, use of an alkaline metal salt such as sodium chloride or potassium chloride as an electrolyte sometimes improves the electric power generation performance of the metal-air battery. For example, an alkaline metal salt may be incorporated previously in a separator of a metal-air battery, and when the separator containing the alkaline metal salt contacts water being a liquid being an object to be detected, an action of the water containing the alkaline metal salt improves the ionic conductivity between a positive electrode and a negative electrode, whereby the metal-air battery can exhibit an excellent electric power generation performance.

However, the long-term installation of a liquid detection sensor in the state that the alkaline metal salt is contained in the separator sometimes causes the alkaline metal salt in the separator to absorb moisture and be liquefied and to result in deteriorating the negative electrode of the metal-air battery. The deterioration of the negative electrode of the metal-air battery during the long-term installation of the liquid detection sensor poses such a problem that liquid leakage and water flooding cannot precisely be detected.

SUMMARY

In consideration of the above situation, the present disclosure has an object to provide a liquid detection sensor which has the general purpose usability and can prevent the deterioration of a metal-air battery being an electric power source even when the liquid detection sensor is installed for a long term, and in which the metal-air battery being an electric power source can exhibit an excellent electric power generation performance.

The gist of the constitution of the present disclosure is as follows.

[1] A liquid detection sensor, comprising a metal-air battery having a positive electrode, a negative electrode, and an electrolytic solution-forming component positioned between the positive electrode and the negative electrode, wherein the electrolytic solution-forming component is enclosed in an inside of a resin-made bag; and a resin of the resin-made bag has dissolvability or dispersibility in a liquid being an object to be detected.

[2] The liquid detection sensor according to [1], wherein the resin of the resin-made bag is a water-soluble resin or an oil-soluble resin.

[3] The liquid detection sensor according to [1] or [2], wherein the resin-made bag having the electrolytic solution-forming component enclosed therein is one or plural in number.

[4] The liquid detection sensor according to any one of [1] to [3], further comprising a support member having voids and supporting the positive electrode and the negative electrode, between the positive electrode and the negative electrode.

[5] The liquid detection sensor according to [4], wherein the resin-made bag having the electrolytic solution-forming component enclosed therein is carried by the support member.

[6] The liquid detection sensor according to any one of [1] to [5], wherein the resin-made bag having the electrolytic solution-forming component enclosed therein is disposed between the positive electrode and the negative electrode.

[7] The liquid detection sensor according to [4], wherein the resin-made bag having the electrolytic solution-forming component enclosed therein is disposed between the support member and the positive electrode and/or between the support member and the negative electrode.

[8] The liquid detection sensor according to any one of [1] to [7], wherein the electrolytic solution-forming component comprises water, an alkaline metal salt, or an aqueous solution of an alkaline metal salt.

[9] The liquid detection sensor according to any one of [1] to [8], wherein an active material of the negative electrode comprises at least one metal selected from the group consisting of magnesium (Mg), aluminum (Al), lithium (Li), calcium (Ca), and zinc (Zn).

[10] The liquid detection sensor according to any one of [1] to [9], having a notifying unit that receives electric power of the metal-air battery and notifies detection of a liquid.

[11] The liquid detection sensor according to any one of [1] to [9], having a notifying unit capable of wireless signal transmission of a detection signal of the metal-air battery to a signal receiving unit.

[12] The liquid detection sensor according to any one of [1] to [11], wherein the liquid detection sensor is a water detection sensor.

[13] The liquid detection sensor according to any one of [1] to [11], wherein the liquid detection sensor is an oil detection sensor.

In the aspect of the above [1], when a liquid being an object to be detected by the liquid detection sensor contacts the resin-made bag of the metal-air battery, the resin-made bag is dissolved in the liquid being an object to be detected and the electrolytic solution-forming component enclosed in the inside of the resin-made bag is thereby released in between the positive electrode and the negative electrode of the metal-air battery. The release of the electrolytic solution-forming component in between the positive electrode and the negative electrode of the metal-air battery leads to generation of electric power or an improvement in the electric power generation performance, and the liquid detection sensor, by the electric power generation of the metal-air battery, notifies to the outside that the liquid being an object to be detected has been detected.

According to aspects of the liquid detection sensor of the present disclosure, because the electrolytic solution-forming component of the metal-air battery being an electric power source is enclosed in the inside of the resin-made bag having dissolvability in a liquid being an object to be detected, by suitably selecting the resin kind of the resin-made bag, the general purpose usability including detection of water and detection of an oil is improved. Then according to aspects of the liquid detection sensor of the present disclosure, because the electrolytic solution-forming component of the metal-air battery is enclosed in the inside of the resin-made bag, the deterioration of the metal-air battery by the electrolytic solution-forming component can be prevented even when the liquid detection sensor is installed for a long term. Further according to aspects of the liquid detection sensor of the present disclosure, because the electrolytic solution-forming component of the metal-air battery is enclosed in the inside of the resin-made bag, the electrolytic solution-forming component preventing the deterioration of the metal-air battery and simultaneously imparting the metal-air battery with an excellent electric power generation performance can be used, and therefore the metal-air battery can exhibit an excellent electric power generation performance.

According to aspects of the liquid detection sensor of the present disclosure, because the resin of the resin-made bag is a water-soluble resin, the liquid detection sensor functions as a water detection sensor; and because the resin of the resin-made bag is an oil-soluble resin, the liquid detection sensor functions as an oil detection sensor.

According to aspects of the liquid detection sensor of the present disclosure, because the resin-made bag having the electrolytic solution-forming component enclosed therein is plural in number, since the electrolytic solution-forming component is supplied smoothly to the entire of the electrodes, the electric power generation efficiency of the metal-air battery improves.

DETAILED DESCRIPTION

Hereinafter, the details of liquid detection sensors according to embodiments of the present disclosure will be described. First, a liquid detection sensor according to a first embodiment of the present disclosure will be described. Here, FIG. 1 is a side view to interpret an outline of the liquid detection sensor according to the first embodiment of the present disclosure, and FIG. 2 is a side view to interpret a state of the liquid detection sensor according to the first embodiment of the present disclosure when the liquid detection sensor detects a liquid.

Figure 1:
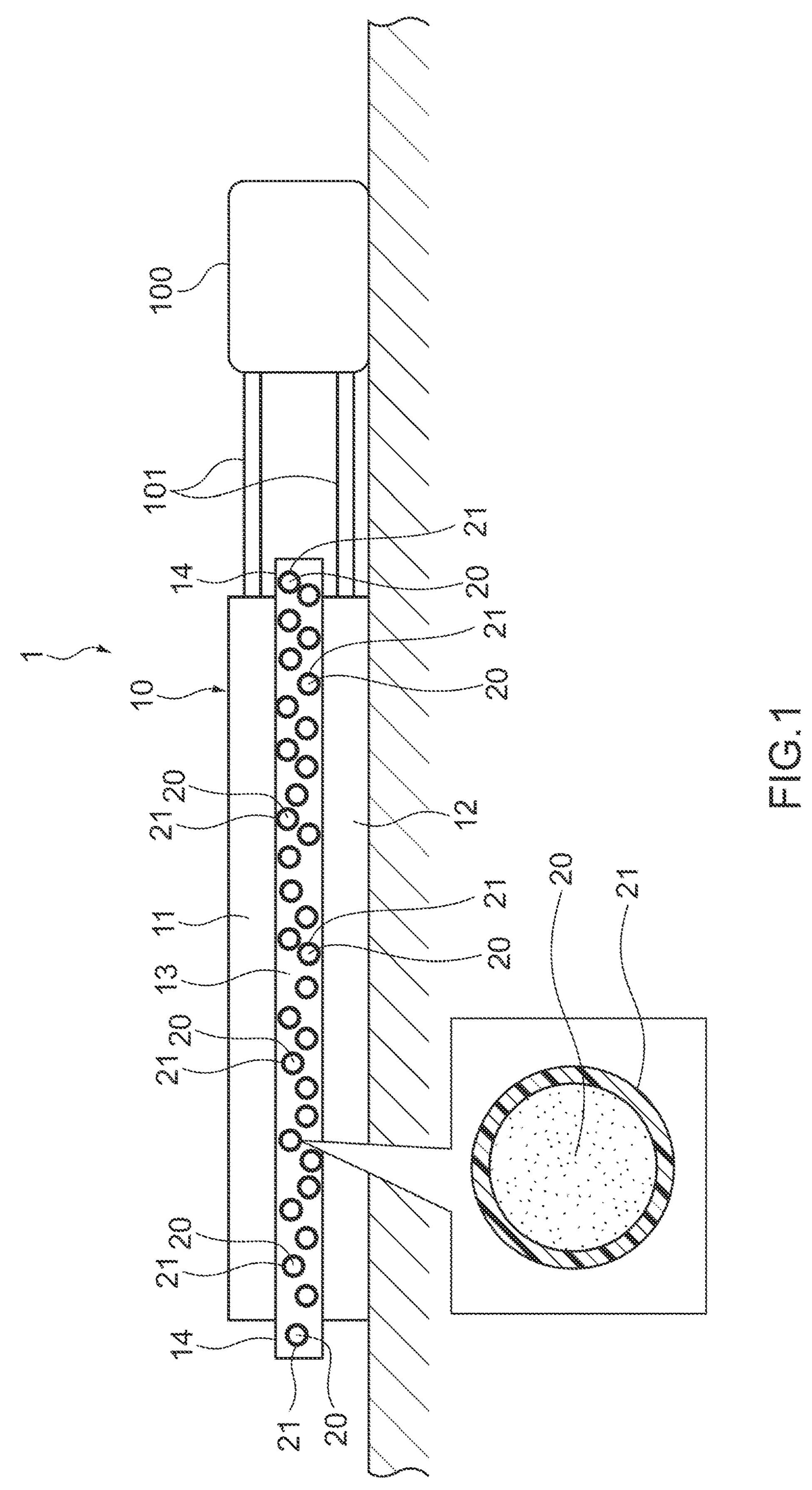
FIG. 1 A side view to interpret an outline of a liquid detection sensor according to a first embodiment of the present disclosure.
Figure 2:
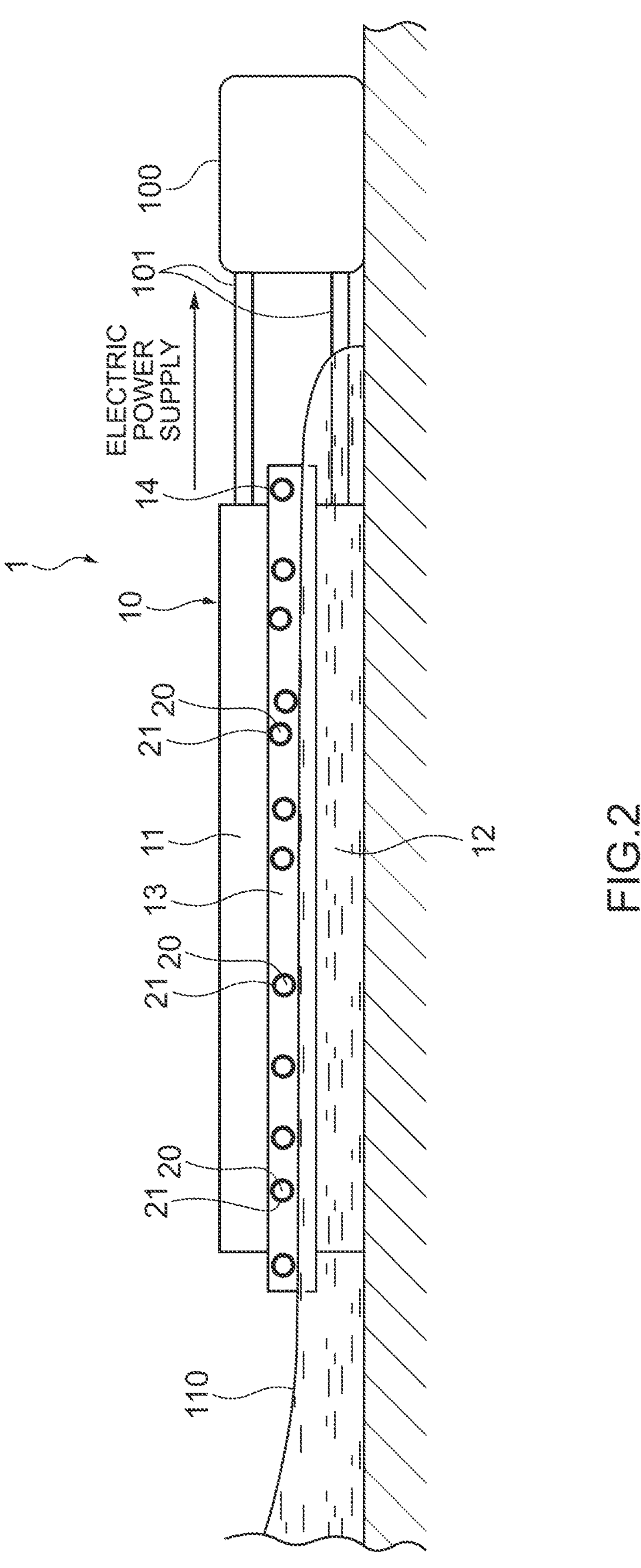
FIG. 2 A side view to interpret a state of the liquid detection sensor according to the first embodiment when the liquid detection sensor detects a liquid.

As illustrated in FIG. 1, a liquid detection sensor 1 according to the first embodiment of the present disclosure has a metal-air battery 10, and a notifying unit 100 connected with the metal-air battery 10 through an electric wire part 101. The notifying unit 100 has a function in which, upon receiving electric power generated by the metal-air battery 10 through the electric wire part 101, the notifying unit 100 notifies detection of a liquid by notification means.

The metal-air battery 10 has a positive electrode 11, a negative electrode 12 facing the positive electrode 11, and a separator 13 having voids positioned between the positive electrode 11 and the negative electrode 12. In the metal-air battery 10 of the liquid detection sensor 1, any of the positive electrode 11, the separator 13 and the negative electrode 12 is in a sheet form; and a laminate structure is made in which the positive electrode 11, the separator 13 and the negative electrode 12 are laminated in order. A peripheral part 14 of the separator 13 extends in the outward direction of the positive electrode 11 and the negative electrode 12, and is exposed from the positive electrode 11 and the negative electrode 12. The separator 13 functions, in order to prevent short circuiting of the positive electrode 11 and the negative electrode due to contact with each other, as a support member to support the positive electrode 11 and the negative electrode 12 with a predetermined space therebetween.

In the metal-air battery 10, an electrolytic solution-forming component 20 is disposed between the positive electrode 11 and the negative electrode 12. That is, the electrolytic solution-forming component 20 is interposed between the positive electrode 11 and the negative electrode 12. The electrolytic solution-forming component 20 is a component forming an electrolytic solution of the metal-air battery 10 or an electrolytic solution of the metal-air battery 10. The metal-air battery 10 starts self-electric power generation due to contact of the positive electrode 11 and the negative electrode 12 with the electrolytic solution.

As illustrated in FIG. 1, the electrolytic solution-forming component 20 is enclosed in the inside of a resin-made bag 21. Therefore, the electrolytic solution-forming component 20 has a form of contacting neither of the positive electrode 11 and the negative electrode 12. The form of the resin-made bag 21 is, for example, a bag-form member having a thin-film, a bag-form member in film-form or a capsule-form member such as a microcapsule. The resin-made bag 21 encapsulates the electrolytic solution-forming component 20, and hermetically encapsulates a certain amount of the electrolytic solution-forming component 20. Therefore, the resin-made bag 21 functions as a shell.

In the metal-air battery 10, the resin-made bag 21 having the electrolytic solution-forming component 20 enclosed therein is plural in number; the electrolytic solution-forming component 20 is divided into a plurality thereof each having a certain amount thereof, and the plurality thereof are each enclosed in the inside of one resin-made bag 21. Then, the resin-made bag 21 having the electrolytic solution-forming component 20 enclosed therein is carried by the separator 13 having a porous structure. Because the resin-made bag 21 having the electrolytic solution-forming component 20 enclosed therein is carried by the separator 13, the electrolytic solution-forming component 20 is interposed between the positive electrode 11 and the negative electrode 12. The resin-made bag 21 having the electrolytic solution-forming component 20 enclosed therein is carried in a state of being dispersed in the surface portion and the inside of the separator 13. In FIG. 1, throughout the entire of the separator 13, there are carried a plurality of the resin-made bags 21 each having the electrolytic solution-forming component 20 enclosed therein.

The resin-made bag 21 is formed of a resin having dissolvability or dispersibility in a liquid being an object to be detected by the liquid detection sensor 1. In the case where the liquid being an object to be detected by the liquid detection sensor 1 is water or a liquid containing water, the resin-made bag 21 is formed, for example, of a water-soluble resin. Because the resin-made bag 21 is formed of a water-soluble resin, the liquid detection sensor 1 functions as a water detection sensor.

Examples of the water-soluble resin include a resin composition containing 100 parts by mass of a polyvinyl alcohol-based resin (A) containing a copolymer unit composed of a sulfonic acid group or a carboxyl group and 3 to 100 parts by mass of an addition reaction product (B) obtained by additionally reacting 1 to 4 mol of an alkylene oxide with 1 mol of a tri- to hexa-polyhydric alcohol.

The polyvinyl alcohol-based resin (A) is a saponified substance of a polyvinyl ester containing a copolymer unit composed of a sulfonic acid group or a carboxyl group. The vinyl ester includes vinyl acetate, vinyl propionate and vinyl formate. These compounds may be used singly or concurrently in two or more.

A monomer containing a sulfonic acid group is not especially limited as long as the monomer is copolymerizable with the vinyl ester and after saponification, a sulfonic acid group or a salt thereof is present in the polyvinyl alcohol-based resin. Specific examples thereof include 2-(meth)acrylamide-2-methylpropanesulfonic acid and alkaline metal salts of 2-(meth)acrylamide-2-methylpropanesulfonic acid, 2-(meth)acrylamide-1-methylpropanesulfonic acid and alkaline metal salts of 2-(meth)acrylamide-1-methylpropanesulfonic acid, olefinsulfonic acids such as ethylenesulfonic acid, allylsulfonic acid and methallylsulfonic acid, and metal salts of the olefinsulfonic acids. These compounds may be used singly or concurrently in two or more. Here, in the present description, "(meth)acryl" means "acryl and/or methacryl".

A monomer containing a carboxyl group is not especially limited as long as the monomer is copolymerizable with the vinyl ester and after saponification, a carboxylic acid or a salt thereof is present in the polyvinyl alcohol-based resin. Specific examples thereof include maleic anhydride, monoalkyl maleates, dialkyl maleates, itaconic acid, alkyl itaconates, (meth)acrylic acid, allylcarboxylic acid, and (meth) acrylate esters to be derived to carboxylic acids or salts thereof after saponification. These compounds may be used singly or concurrently in two or more.

The content of the above copolymer unit in the polyvinyl alcohol-based resin (A) is not especially limited, but is, from the viewpoint of the balance between excellent water dissolvability and mechanical strength, for example, 0.1 to 20% by mol. The saponification degree of the polyvinyl alcohol-based resin (A) is, for example, 40% by mol or higher and 100% by mol or lower. The viscosity-average degree of polymerization of the polyvinyl alcohol-based resin (A) is, for example, 200 or higher and 10,000 or lower.

Examples of the tri- to hexa-polyhydric alcohol being a raw material of the addition reaction product (B) include glycerol, trimethylolpropane, diglycerol, pentaerythritol, xylose, arabinose, ribulose and sorbitol. Examples of an alkylene oxide being a raw material of the addition reaction product (B) include ethylene oxide and propylene oxide. These compounds may be used singly or concurrently in two or more.

Examples of a method of forming a film of the above resin composition include a method of casting an aqueous solution of the above resin composition. The resin-made bag 21 of the above resin composition is high in the dissolving rate to water and even in the case of enclosing the electrolytic solution-forming component 20 for a long term, retains the water dissolvability and is excellent also in the mechanical strength.

The water-soluble resin includes resin composites of a polyvinyl alcohol-based polymer with at least one resin selected from polysaccharides and acrylic resins. Examples of a form of the resin-made bag 21 using the resin composite include a resin laminate having a first layer containing a polyvinyl alcohol-based polymer and a second layer containing at least one resin selected from polysaccharides and acrylic resins.

The polyvinyl alcohol-based polymer includes one prepared by saponifying a polyvinyl ester-based polymer obtained by polymerizing a vinyl ester-based monomer. Examples of the vinyl ester-based monomer include vinyl formate, vinyl acetate, vinyl propionate, vinyl valerate, vinyl laurate, vinyl stearate and vinyl benzoate. These compounds may be used singly or concurrently in two or more.

The polyvinyl alcohol-based polymer may also be a copolymer of a vinyl ester-based monomer with another monomer copolymerizable with the vinyl ester-based monomer. Examples of the another monomer include olefins having 2 to 30 carbon atoms, such as ethylene, propylene and butene; (meth)acrylic acid; (meth)acrylate esters such as methyl (meth)acrylate, ethyl (meth)acrylate, propyl (meth) acrylate, butyl (meth)acrylate, ethylhexyl (meth)acrylate, dodecyl (meth)acrylate and octadecyl (meth)acrylate; (meth)acrylamides such as (meth)acrylamide, N-methyl (meth)acrylamide, N-ethyl(meth)acrylamide, N,N-dimethyl (meth)acrylamide, diacetone(meth)acrylamide, (meth)acrylamidopropyldimethylamine and N-methylol(meth) acrylamide; vinyl ethers such as methyl vinyl ether, ethyl vinyl ether, propyl vinyl ether, butyl vinyl ether, dodecyl vinyl ether and stearyl vinyl ether; vinyl cyanides such as (meth)acrylonitrile; vinyl halides such as vinyl chloride, vinylidene chloride, vinyl fluoride and vinylidene fluoride; allyl compounds such as allyl acetate and allyl chloride; maleic acid; maleate esters; itaconic acid; itaconate esters; vinyl silyl compounds such as vinyltrimethoxysilane; isopropenyl acetate; vinylamides such as N-vinylformamide, N-methyl-N-vinylformamide, N-vinylacetamide and N-methyl-N-vinylacetamide; N-vinyl-2-pyrrolidones; N-vinyl-2-caprolactam; and sulfonic acid group-containing monomers such as 2-(meth)acrylamide-2-methylpropanesulfonic acid, 2-(meth)acrylamide-1-methylpropanesulfonic acid, ethylenesulfonic acid, allylsulfonic acid and methacrylsulfonic acid. These compounds may be used singly or concurrently in two or more.

The saponification degree of the polyvinyl alcohol-based polymer is, for example, 75% by mol or higher and 99% by mol or lower. The viscosity-average degree of polymerization of the polyvinyl alcohol-based polymer is, for example, 300 or higher and 2,500 or lower. Examples of a method of preparing the first layer include methods (for example, casting film forming method, solution coating method, wet film forming method and gel film forming method) of using a polyvinyl alcohol-based polymer solution in which the polyvinyl alcohol-based polymer is dissolved in a solvent.

The second layer contains at least one resin selected from polysaccharides and acrylic resins. The polysaccharides of the second layer include starches and cellulosic resins.

Examples of the starches include starches of natural origin, such as potato starch, cornstarch, wheat starch and rice starch; starches made by thermally gelatinizing and drying starches of natural origin; and modified starches such as acetylated oxidized starch, sodium octenylsuccinic acid starch, starch acetate, oxidized starch, hydroxypropyl starch, hydroxypropylated phosphoric acid-crosslinked starch, phosphomonoesterified phosphoric acid-crosslinked starch, phosphorylated starch and starch nitrate. Examples of the cellulosic resins include carboxymethylcellulose, hydroxymethylcellulose, hydroxyethylcellulose, hydroxyethylmethylcellulose, hydroxypropylcellulose, hydroxypropylmethylcellulose and methyl cellulose. These compounds may be used singly or concurrently in two or more.

Examples of the acrylic resins include polyacrylamides.

Examples of a method of preparing the second layer include methods (for example, casting film forming method, solution coating method and wet film forming method) of using a resin solution in which at least one resin selected from polysaccharides and acrylic resins is dissolved in a solvent.

Examples of methods of preparing the resin laminate having the first layer and the second layer include such as a method in which the first layer and the second layer are previously prepared and then laminated; a method in which a coating liquid to form the second layer containing at least one resin selected from polysaccharides and acrylic resins is coated on the first layer previously prepared; a method in which a coating liquid to form the first layer containing a polyvinyl alcohol-based polymer is coated on the second layer previously prepared; a method in which the first layer and the second layer are coextruded; and a method in which the second layer is extruded or coated to be laminated on the first layer before the first layer is completely dried or cooled in production of the first layer, and the first layer and the second layer are simultaneously dried or cooled.

Water-soluble resins other than the above include water-soluble vinylic resins such as polyvinyl alcohol, polyvinylpyrrolidone, polyacrylamide, polyvinyl methylene ether; polyether-based resins such as polyethylene oxide; cellulosic resins such as carboxymethylcellulose, hydroxypropylcellulose and hydroxyethylcellulose; acrylic resins such as poly(meth)acrylate; and polysaccharide-based polymers such as alginic acid, pullulan and xanthan, and the like.

A method of enclosing the electrolytic solution-forming component 20 in the resin-made bag is not especially limited, and examples thereof include a method in which the electrolytic solution-forming component 20 is put in the resin-made bag from an opening of the resin-made bag and then, the opening of the resin-made bag is adhered and thermally fused for enclosing, and an enclosing method using a microcapsule production method using W/O dispersion or 01W dispersion. Then, a method of making a plurality of the resin-made bags 21 having the electrolytic solution-forming component 20 enclosed therein to be carried by the separator 13 is not especially limited, and examples thereof include a method in which the resin-made bags 21 are introduced under pressure into void parts of the separator 13, a method in which the resin-made bags 21 are dispersed in a dispersion medium such as a solvating media and then impregnated in the separator 13, and then, the dispersion medium is dried and removed, and a method in which the separator 13 is divided into a plural number, and the resin-made bags 21 are disposed between the divided separators, and then, the separators 13 are adhered.

Examples of the electrolytic solution-forming component 20 to be enclosed in the resin-made bag 21 whose resin kind is the water-soluble resin include alkaline metal salts such as salts of an alkaline metal and a halogen, such as sodium chloride or potassium chloride, and aqueous solutions of the alkaline metal salts. Other electrolytic solution-forming components 20 include water. Here, even when water, the alkaline metal salt or the solution of the alkaline metal salt is accommodated in the inside of the resin-made bag 21 being the water-soluble resin, since salting-out occurs in the inside of the resin-made bag 21, the resin-made bag 21 is not dissolved and functions as a shell.

An active material of the negative electrode 12 includes magnesium (Mg), magnesium alloys, aluminum (Al), aluminum alloys, lithium (Li), lithium alloys, calcium (Ca), calcium alloys, zinc (Zn) and zinc alloys. Among these, from the viewpoint of the electric power generation efficiency and the easy availability, magnesium (Mg) and magnesium alloys are preferable.

The separator 13 is formed of a material having electric insulativity, ion permeability and liquid permeability. Examples of the material forming the separator 13 include resins, such as polyethylene, polypropylene, polyethylene terephthalate, cellulose, polyamide and acrylic resins, and glasses. Further, the separator 13 is a member having voids, and examples thereof include nonwoven fabrics, glass fibers, woven fabrics having a mesh structure, and membrane members having closed cells or open cells. Examples of the members forming the separator 13 and having voids include members having a porous structure.

The positive electrode 11 has a positive electrode current collector and a catalyst layer. The positive electrode current collector is a member having electroconductivity in which electrons discharged from the negative electrode 12 are conducted to the catalyst layer and gas permeability in which oxygen permeates. Example of the positive electrode current collector include metal wire cloths and foamed metals. The catalyst layer functions as reaction sites of the positive electrode.

Thereafter, an electric power generation system of the metal-air battery 10 in the case where water being an object to be detected by the liquid detection sensor 1 contacts the metal-air battery 10 will be described. Here, for convenience of description, the case where the negative electrode 12 is magnesium (Mg) will be described. When water contacts the peripheral part 14 of the separator 13 and permeates in the entire of the separator 13, in the negative electrode 12, an oxidative reaction indicated by the below (1) occurs. On the other hand, in the positive electrode 11, a reductive reaction indicated by the below (2) occurs. From the above, in the entire of the metal-air battery 10, a reaction indicated by the below (3) occurs and the metal-air battery 10 discharges electricity, that is, self-generates electric power.

$$2Mg \rightarrow 2Mg^{2+} + 4e^- \quad (1)$$

$$O_2 + 2H_2O + 4e^- 4OH^- \quad (2)$$

$$2Mg + O_2 + 2H_2O \rightarrow 2Mg(OH)_2 \quad (3)$$

Thereafter, the detection action in the case where the liquid detection sensor 1 detects water being an object to be detected will be described. As illustrated in FIG. 2, when water 110 being an object to be detected contacts the metal-air battery 10 of the liquid detection sensor 1, the water contacts the peripheral part 14 of the separator 13 and then permeates throughout the entire of the separator 13. Along with the permeation of the water 110 being an object to be detected throughout the entire of the separator 13, the resin-made bag 21 formed of a resin having dissolvability or dispersibility in water 110 is dissolved or dispersed. That is, the resin-made bag 21 is broken by the water 110 being an object to be detected. When the resin-made bag 21 is dissolved or dispersed, the electrolytic solution-forming component 20 having been enclosed in the resin-made bag 31 (for example, sodium chloride or water containing sodium chloride) is released into the water 110. As described above, when the water 110 being an object to be detected permeates the separator 13, since the water 110 acts as an electrolytic solution, the metal-air battery 10 discharges electricity. When the metal-air battery 10 discharges electricity, the electrolytic solution-forming component 20 released from the resin-made bag 21 results in being contained in the water 110 acting as an electrolytic solution, and accordingly, the ionic conductivity between the positive electrode 11 and the negative electrode 12 improves by the action of the electrolytic solution-forming component 20, and the electric power generation performance of the metal-air battery 10 improves.

When the metal-air battery 10 generates electric power, the electric power from the metal-air battery 10 is supplied through the electric wire part 101 to the notifying unit 100. When the notifying unit 100 receives the electric power generated by the metal-air battery 10, the notifying unit 100 notifies a detection of the liquid by notifying means the notifying unit 100 has.

In the liquid detection sensor 1, because the electrolytic solution-forming component 20 of the metal-air battery 10 being an electric power source is enclosed in the inside of the resin-made bag 21 having dissolvability or dispersibility in water 110 being an object to be detected, the liquid detection sensor 1 can be used in every field, in the case of detection of water, and the general purpose usability improves. Further, in the liquid detection sensor 1, because the electrolytic solution-forming component 20 of the metal-air battery 10 is enclosed in the inside of the resin-made bag 21, the deterioration of the metal-air battery 10 by the electrolytic solution-forming component 20 can be prevented even when the liquid detection sensor 1 is installed for a long term, and the detection precision improves. Further, in the liquid detection sensor 1, because the electrolytic solution-forming component 20 of the metal-air battery 10 is enclosed in the inside of the resin-made bag 21, the electrolytic solution-forming component 20 preventing the deterioration of the metal-air battery 10 and simultaneously imparting the metal-air battery 10 with an excellent electric power generation performance can be used, and therefore the metal-air battery 10 can exhibit an excellent electric power generation performance. Further, since the metal-air battery 10 exhibit an excellent electric power generation performance, the electric energy received by the notifying unit 100 increases and the notification performance of the notifying unit 100 improves.

Then, in the liquid detection sensor 1, because the resin-made bag 21 having the electrolytic solution-forming component 20 enclosed therein is plural in number, since the electrolytic solution-forming component 20 is supplied smoothly to the entire of the electrodes, the electric power generation efficiency of the metal-air battery 10 improves.

Thereafter, a liquid detection sensor according to a second embodiment of the present disclosure will be described. Here, since major parts of the liquid detection sensor according to the second embodiment are common with those of the liquid detection sensor according to the first embodiment, the same constituents as in the liquid detection sensor according to the first embodiment will be described by using the same reference signs. Then, FIG. 3 is a side view to interpret an outline of the liquid detection sensor according to the second embodiment of the present disclosure; and FIG. 4 is a side view to interpret a state of the liquid detection sensor according to the second embodiment of the present disclosure when the liquid detection sensor detects a liquid.

The liquid detection sensor according to the first embodiment is a water detection sensor and the resin-made bag thereof is formed of a resin having dissolvability or dispersibility in water. Alternatively, a liquid detection sensor 2 according to the second embodiment is an oil detection sensor; therefore, resin-made bags 31 having an electrolytic solution-forming component 30 enclosed therein are formed of a resin having dissolvability or dispersibility in an oil.

In such a manner, the liquid detection sensor of the present disclosure can suitably alter the kind of the liquid being an object to be detected by suitably altering the dissolvability or dispersibility of the resin to form the resin-made bag. That is, the liquid detection sensor of the present disclosure is excellent in the general purpose usability also in that the kind of the liquid being an object to be detected can suitably be altered.

Figure 3:
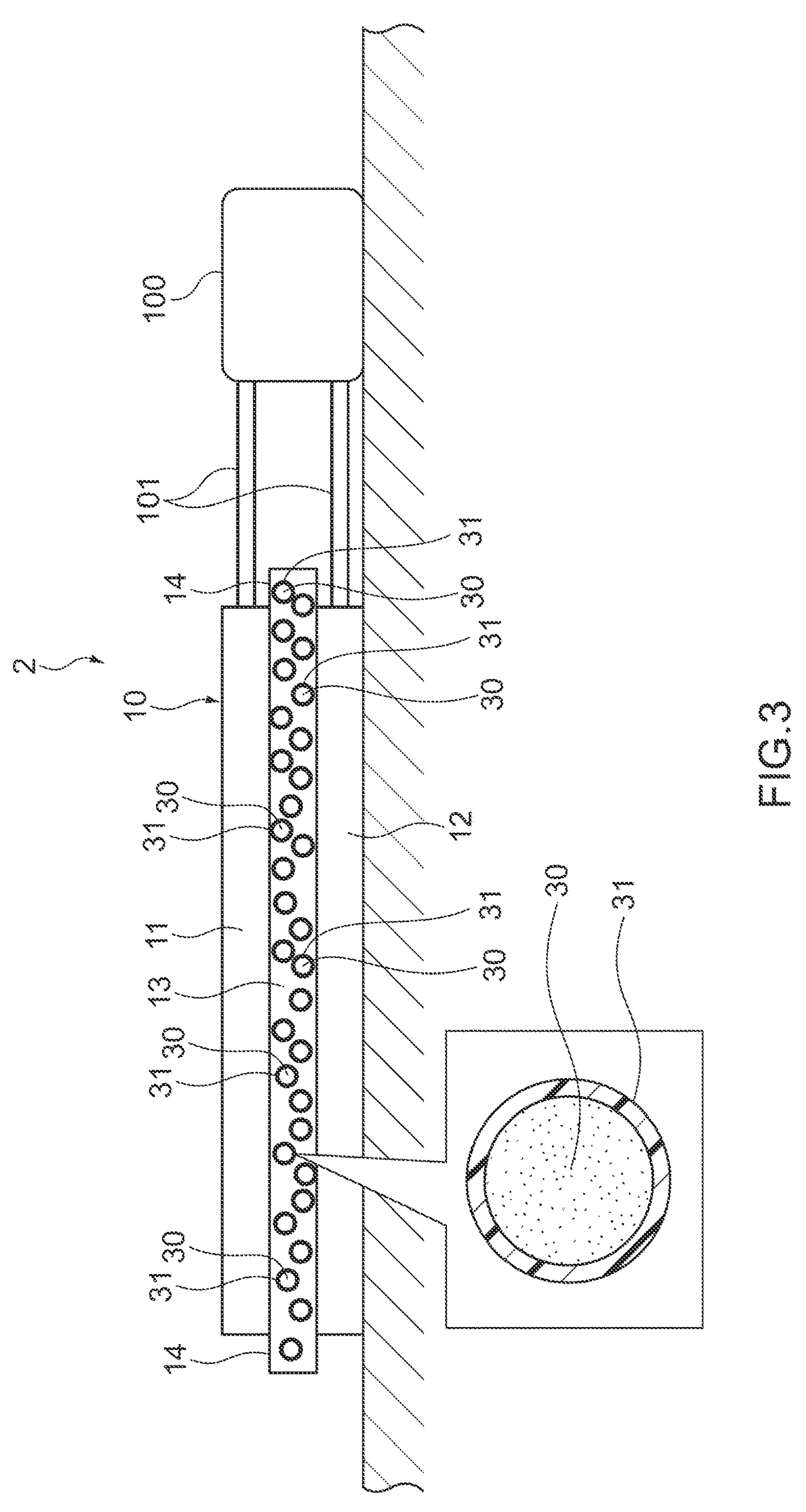
FIG. 3 A side view to interpret an outline of a liquid detection sensor according to a second embodiment of the present disclosure.
Figure 4:
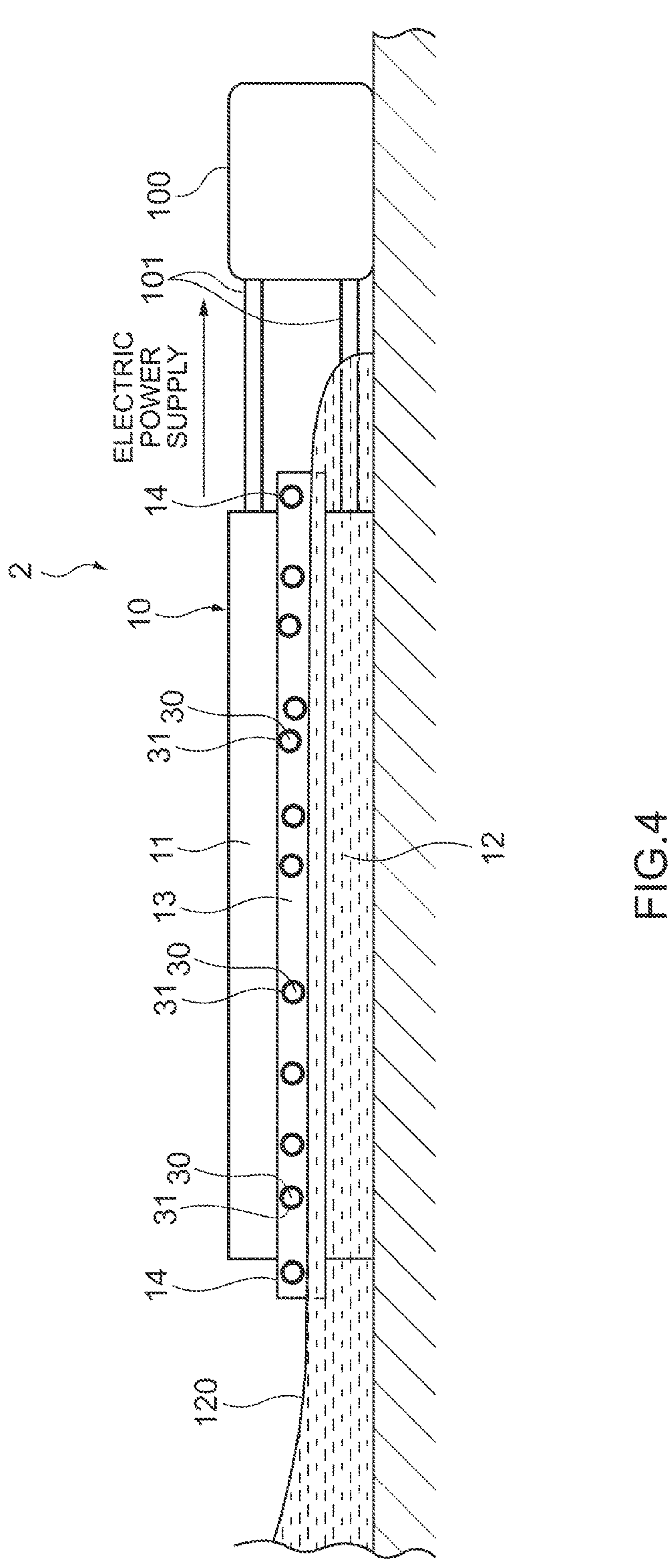
FIG. 4 A side view to interpret a state of the liquid detection sensor according to the second embodiment when the liquid detection sensor detects a liquid.

As illustrated in FIG. 3, in a metal-air battery 10, an electrolytic solution-forming component 30 is disposed between a positive electrode 11 and a negative electrode 12. The electrolytic solution-forming component 30 is enclosed in the inside of a resin-made bag 31. The resin-made bag 31 having the electrolytic solution-forming component 30 enclosed therein is plural in number; the electrolytic solution-forming component 30 is divided into a plurality thereof each having a certain amount thereof, and the plurality thereof are each enclosed in the inside of one resin-made bag 31. Then, the resin-made bags 31 having the electrolytic solution-forming component 30 enclosed therein are carried in the surface portion and the inside of a separator 13 throughout the entire of the separator 13 having a porous structure.

The resin-made bag 31 is formed of an oil-soluble resin, for example, as a resin having dissolvability or dispersibility in an oil. Because the resin-made bag 31 is formed of an oil-soluble resin, the liquid detection sensor 2 functions as an oil detection sensor.

Examples of the oil-soluble resin include terpene-based resins such as candelilla resins, hydrogenated pentaerythrityl rosin acid and hydrogenated glyceryl abietate, silicone-based resins such as trimethylsiloxy silicic acid, polymethylsilsesquioxane and acryl-silicone graft copolymers, and hydrocarbon-based resins such as polyvinyl isobutyl ether and polyisobutylene. These compounds may be used singly or concurrently in two or more.

A method of enclosing the electrolytic solution-forming component 30 in the resin-made bag is not especially limited, and examples thereof include a method in which the electrolytic solution-forming component 30 is put in the resin-made bag from an opening of the resin-made bag and then, the opening of the resin-made bag is adhered and thermally fused for enclosing, and an enclosing method using a microcapsule production method using W/O dispersion or 01W dispersion. Then, a method of making a plurality of the resin-made bags 31 having the electrolytic solution-forming component 30 enclosed therein to be carried by the separator 13 is not especially limited, and examples thereof include a method in which the resin-made bags 31 are introduced under pressure into void parts of the separator 13, a method in which the resin-made bags 31 are dispersed in a dispersion medium such as a solvating media and then impregnated in the separator 13, and then, the dispersion medium is dried and removed, and a method in which the separator 13 is divided into a plural number, and the resin-made bags 31 are disposed between the divided separators, and then, the separators 13 are adhered.

The oil being an object to be detected by the liquid detection sensor 2 is not an electrolytic solution-forming component of the metal-air battery 10. Therefore, an electrolytic solution is enclosed as the electrolytic solution-forming component 30 in the resin-made bag 31 whose resin kind is the oil-soluble resin. Examples of the electrolytic solution-forming component 30 include a water (aqueous solutions of an alkaline metal salt) containing an alkaline metal salt such as sodium chloride or potassium chloride, and water.

Thereafter, the detection action in the case where the liquid detection sensor 2 detects an oil being an object to be detected will be described. As illustrated in FIG. 4, when an oil 120 being an object to be detected contacts the metal-air battery 10 of the liquid detection sensor 2, the oil contacts the peripheral part 14 of the separator 13 and then permeates throughout the entire of the separator 13. Along with the permeation of the oil 120 throughout the entire of the separator 13, the resin-made bag 31 formed of a resin having dissolvability or dispersibility in the oil 120 is dissolved or dispersed. That is, the resin-made bag 31 is broken by the oil 120 being an object to be detected. When the resin-made bag 31 is dissolved or dispersed, the electrolytic solution-forming component 30 having been enclosed in the resin-made bag 31 (for example, an aqueous solution of an alkaline metal salt) is released into the oil 120. Since the electrolytic solution-forming component 30 released in the oil 120 acts as an electrolytic solution, the metal-air battery 10 discharges electricity. When the metal-air battery 10 discharges electricity, the aqueous solution of the alkaline metal salt is released as an electrolytic solution from the resin-made bag 31, and accordingly the ionic conductivity between the positive electrode 11 and the negative electrode 12 improves by the action of the electrolytic solution-forming component 30, and the electric power generation performance of the metal-air battery 10 improves.

In the liquid detection sensor 2, because the electrolytic solution-forming component 30 of the metal-air battery 10 being an electric power source is enclosed in the inside of the resin-made bag 31 having dissolvability or dispersibility in the oil 120 being an object to be detected, the liquid detection sensor 2 can be used for detection of the oil. Further, in the liquid detection sensor 2, because the electrolytic solution-forming component 30 of the metal-air battery 10 is enclosed in the inside of the resin-made bag 31, the deterioration of the metal-air battery 10 by the electrolytic solution-forming component 30 can be prevented even when the liquid detection sensor 2 is installed for a long term, and the detection precision improves.

Figure 5:
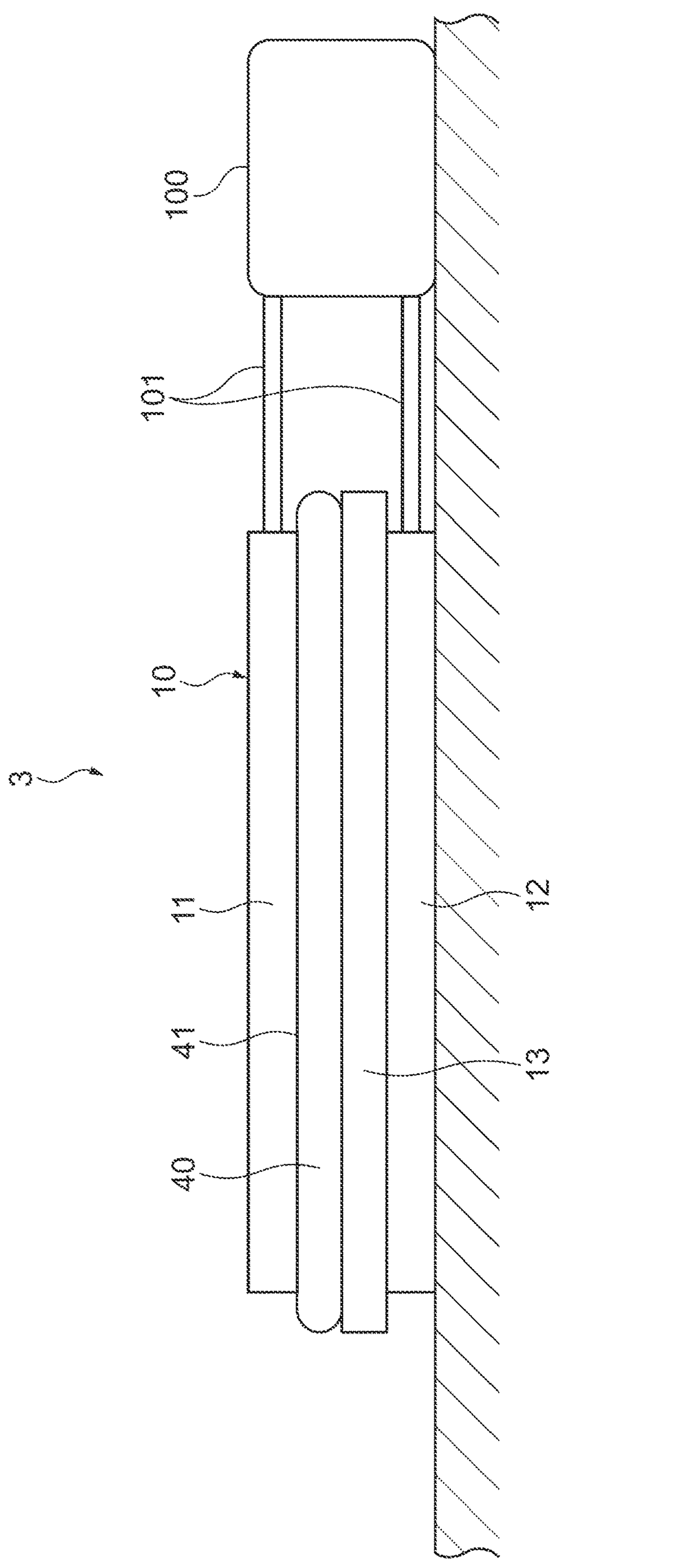
FIG. 5 A side view to interpret an outline of a liquid detection sensor according to a third embodiment of the present disclosure.

Thereafter, a liquid detection sensor according to a third embodiment of the present disclosure will be described. Here, since major parts of the liquid detection sensor according to the third embodiment are common with those of the liquid detection sensors according to the first and second embodiments, the same constituents as in the liquid detection sensors according to the first and second embodiments will be described by using the same reference signs. Then, FIG. 5 is a side view to interpret an outline of the liquid detection sensor according to the third embodiment of the present disclosure.

In the liquid detection sensors according to the first and second embodiments described in the above, the plurality of the resin-made bags having the electrolytic solution-forming component enclosed therein are dispersed throughout the entire of the separator and carried in the surface portion and the inside of the separator. Alternatively, as illustrated in FIG. 5, in a liquid detection sensor 3 according to the third embodiment, a resin-made bag 41 having an electrolytic solution-forming component 40 enclosed therein is held between a positive electrode 11 or a negative electrode 12 and a separator 13. That is, the resin-made bag 41 having the electrolytic solution-forming component 40 enclosed therein is interposed between the positive electrode 11 or the negative electrode 12 and the separator 13. The resin-made bag 41 having the electrolytic solution-forming component 40 enclosed therein may be interposed between the positive electrode 11 and the separator 13, or may be interposed between the negative electrode 12 and the separator 13. Here, in FIG. 5, the resin-made bag 41 having the electrolytic solution-forming component 40 enclosed therein is interposed between the positive electrode 11 and the separator 13.

In the liquid detection sensor 3, the resin-made bag 41 having the electrolytic solution-forming component 40 enclosed therein is installed as one or more resin-made bags 41 between electrodes (in FIG. 5, the positive electrode 11) and the separator 13. The number of the resin-made bags 41 to be installed may be one or plural, but it is preferable that the resin-made bag 41 is one in number, from the viewpoint of easiness in installation and stability of fixation. Here, in FIG. 5, one resin-made bag 41 is installed. Therefore, in the liquid detection sensor 3 of FIG. 5, the electrolytic solution-forming component 40 is enclosed in the resin-made bag 41 in the state of being held collectively in one part. The resin-made bag 41 having the electrolytic solution-forming component 40 enclosed therein is installed over nearly the entire of the surface of the separator 13.

In the case where the liquid detection sensor 3 is used as a water detection sensor, the resin-made bag 41 is formed of a water-soluble resin. Examples of the electrolytic solution-forming component 40 to be enclosed in the resin-made bag 41 include alkaline metal salts, such as salts of an alkaline metal and a halogen, such as sodium chloride or potassium chloride, and aqueous solutions of the alkaline metal salts.

In the case where the liquid detection sensor 3 is used as an oil detection sensor, the resin-made bag 41 is formed of an oil-soluble resin. Examples of the electrolytic solution-forming component 40 to be enclosed in the resin-made bag 41 include a water (an aqueous solution of an alkaline metal salt) containing an alkaline metal salt such as sodium chloride or potassium chloride, and water.

Also in the liquid detection sensor 3, because the electrolytic solution-forming component 40 of the metal-air battery 10 is enclosed in the inside of the resin-made bag 41, the deterioration of the metal-air battery 10 by the electrolytic solution-forming component 40 can be prevented even when the liquid detection sensor 3 is installed for a long term, and the detection precision improves. Further, also in the liquid detection sensor 3, because the electrolytic solution-forming component 40 of the metal-air battery 10 is enclosed in the inside of the resin-made bag 41, the electrolytic solution-forming component 40 preventing the deterioration of the metal-air battery 10 and simultaneously imparting the metal-air battery 10 with an excellent electric power generation performance can be used, and therefore the metal-air battery 10 can exhibit an excellent electric power generation performance.

Thereafter, an example of a method of using the liquid detection sensor of the present disclosure will be described. Here, for convenience of description, an example of a method of using a liquid detection sensor by using the liquid detection sensor 1 according to the first embodiment of the present disclosure will be described. Then, FIG. 6 is a diagram to interpret an example of a method of using the liquid detection sensor of the present disclosure.

Figure 6:
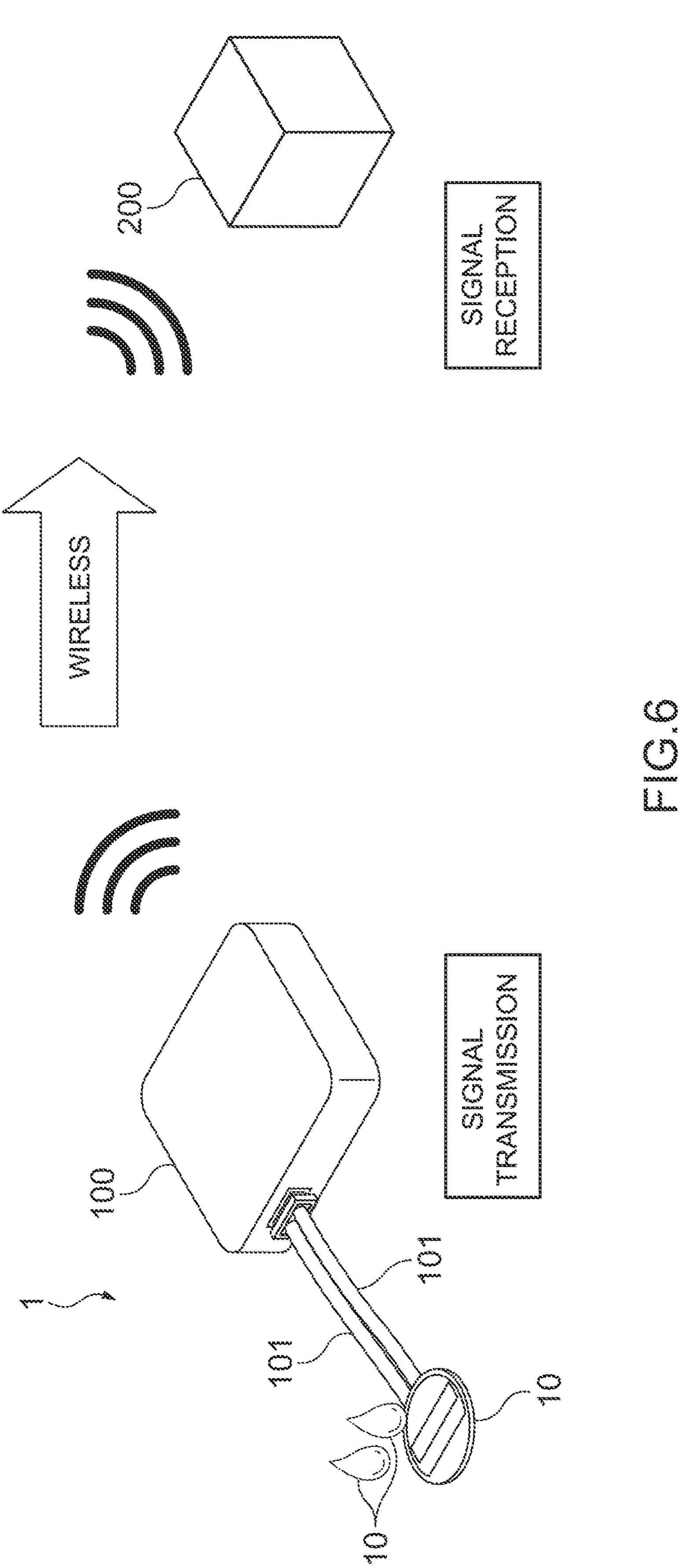
FIG. 6 A diagram to interpret an example of a method of using the liquid detection sensor of the present disclosure.

As shown in FIG. 6, a notifying unit 100 connected with a metal-air battery 10 through an electric wire part 101, for example, when receiving electric power generated by the metal-air battery 10, uses a signal transmitting section in which a signal transmitting function to a signal receiving unit 200 works. When the metal-air battery 10 detects a liquid (in FIG. 6, water 110) being an object to be detected and generates electric power, the notifying unit 100 works a signal transmitting function by receiving from the metal-air battery 10, and transmits a detection signal to the signal receiving unit 200. Examples of the signal transmitting section include a wireless signal transmitting section and a wired signal transmitting section. In FIG. 6, as the notifying unit 100, a wireless signal transmitting section is used and wireless signal transmission of the detection signal to signal receiving unit 200 from notifying unit 100 is made possible. As wireless communication, an existing wireless system, for example, wireless LAN, Bluetooth® or Wi-Fi can be used.

When the signal receiving unit 200 receives the detection signal from the notifying unit 100 of the liquid detection sensor 1, it detects that leakage or the like (in FIG. 6, water leakage or water flooding) of the liquid being an object to be detected occurs; and the occurrence of water leakage or water flooding is notified to a human, and as required, the device and the like are automatically caused to be stopped.

Thereafter, other embodiments of the liquid detection sensor of the present disclosure will be described. In the liquid detection sensors according to the above first and second embodiments, as methods of making the plurality of the resin-made bags having the electrolytic solution-forming component enclosed therein to be carried by the separator, there have been exemplified a method in which the resin-made bags are introduced under pressure into void parts of the separator, a method in which the resin-made bags are dispersed in a dispersion medium such as a solvation media and then impregnated in the separator, and then, the dispersion medium is dried and removed, and a method in which the separator is divided into a plural number, and the resin-made bags are disposed between the divided separators, and then, the separators are adhered. Alternatively, the resin-made bag may be made to be carried and adhered on the separator, by applying a material containing the resin-made bag on the separator surface, and then drying the material. In this form, the resin-made bag is carried and adhered mainly in the surface portion of the separator. Further, to the material containing the resin-made bag, in order to improve the coatability and the like to the separator surface, as required, there may be added a binder, a dispersion medium such as an organic solvent, or the like. Because the material containing the resin-made bag contains a binder, a dispersion medium such as an organic solvent, or the like, since the material becomes a paste, the material containing the resin-made bag can be imparted with an excellent coatability.

Examples of the binder include acrylic polymer, polytetrafluoroethylene (PTFE), ethylene-tetrafluoroethylene copolymers (ETFE), polyvinylidene fluoride (PVDF), polychlorotrifluoroethylene (PCTFE), ethylene-chlorotrifluoroethylene copolymers (ECTFE), perfluoroalkoxyalkanes (PFA) and perfluoroethylene-propene copolymers (FEP). Then, examples of the dispersion medium include alcoholic compounds such as ethylene glycol, propylene glycol, n-propyl alcohol, isopropyl alcohol, n-butyl alcohol, isobutyl alcohol and diethylene glycol, and organic solvents such as N-methylpyrrolidone.

In order to dispose the resin-made bag between the positive electrode and the negative electrode, in the liquid detection sensors according to the above first and second embodiments, the resin-made bags having the electrolytic solution-forming component enclosed therein are made to be carried by the separator; and in the liquid detection sensor according to the third embodiment, the resin-made bag is held between the positive electrode or the negative electrode and the separator. Alternatively, the resin-made bag may be made to be carried and adhered on the surface of the positive electrode facing the negative electrode, by applying a material containing the resin-made bag on the surface of the positive electrode facing the negative electrode in surfaces of the positive electrode, and then drying the material. By making the resin-made bag to be carried and adhered on the positive electrode surface facing the negative electrode, the resin-made bag is disposed between the positive electrode and the negative electrode. More specifically, in the case where the separator is installed between the positive electrode and the negative electrode, the resin-made bag is disposed between the positive electrode and the separator.

Then, to the material containing the resin-made bag, in order to improve coatability and the like to the positive electrode surface, as required, there may be added a binder, a dispersion medium such as an organic solvent, or the like. Examples of the binder include acrylic polymer, polytetrafluoroethylene (PTFE), ethylene-tetrafluoroethylene copolymers (ETFE), polyvinylidene fluoride (PVDF), polychlorotrifluoroethylene (PCTFE), ethylene-chlorotrifluoroethylene copolymers (ECTFE), perfluoroalkoxyalkanes (PFA) and perfluoroethylene-propene copolymers (FEP). Then, examples of the dispersion medium include alcoholic compounds such as ethylene glycol, propylene glycol, n-propyl alcohol, isopropyl alcohol, n-butyl alcohol, isobutyl alcohol and diethylene glycol, and organic solvents such as N-methylpyrrolidone.

Although in the liquid detection sensor according to the first embodiment, the resin-made bag is formed of a water-soluble resin, and in the liquid detection sensor according to the second embodiment, the resin-made bag is formed of an oil-soluble resin, alternatively, in one metal-air battery, there may be used concurrently a resin-made bag formed of a water-soluble resin and a resin-made bag formed of an oil-soluble resin. By concurrently using the resin-made bag of a water-soluble resin and the resin-made bag of an oil-soluble resin, the detection of water and the detection of an oil can be made by one liquid detection sensor. Further in the liquid detection sensors according to the first to third embodiments, although the separator is installed between the positive electrode and the negative electrode, if short circuit by contacting of the positive electrode and the negative electrode can be prevented, no separator may be installed; and no separator is allowed if there is a support member to support the positive electrode and the negative electrode with a predetermined space.

Although in the liquid detection sensor according to the third embodiment, the resin-made bag is held between one electrode (positive electrode) and the separator, alternatively, the resin-made bags may be held between the positive electrode and the separator and between the negative electrode and the separator, respectively. Further, although in the liquid detection sensor according to the third embodiment, one resin-made bag is held between one electrode and the separator, alternatively, a plurality of the resin-made bags may be held between the one electrode and the separator.

Although in the above example of a method of using the liquid detection sensor, the notifying unit is the signal transmitting section having a signal transmitting function to the signal receiving unit, alternatively, the notifying unit may be a liquid detection display section that receives electric power of the metal-air battery and notifies a human of liquid detection. Examples of display means of the liquid detection display section include lighting of an alarm lamp and raising of an alarm sound.

The liquid detection sensor of the present disclosure has the general purpose usability and can prevent the deterioration of the metal-air battery being an electric power source even when being installed for a long term, and since the metal-air battery being an electric power source can exhibit an excellent electric power generation performance, can be utilized in wide-ranging fields of liquid detection, including detection of water leakage and rain leakage of buildings, water leakage and oil leakage of various types of facilities, factories and the like, detection of water flooding of roads, underground facilities and the like, detection of the arrival at the dangerous water level by detection of the water level of rivers, lakes and marshes, and the like, detection of blood leakage and chemical liquid leakage in medical sites, and detection of urination in nursing care sites.

What is claimed is:

1. A liquid detection sensor, comprising a metal-air battery having:

a positive electrode, a negative electrode, a support member having voids and supporting the positive electrode and the negative electrode, wherein the support member is arranged between the positive electrode and the negative electrode, a plurality of resin-made bags, wherein each resin-made bag is introduced into an associated void of the support member, and a resin of each resin-made bag has dissolvability or dispersibility in a liquid being an object to be detected, and a plurality of electrolytic solution-forming components, wherein each electrolytic solution-forming component is enclosed in the inside of an associated resin-made bag of the plurality of resin-made bags, wherein each resin-made bag comprises:

an oil-soluble resin, or a water-soluble resin composite comprising a polyvinyl alcohol-based polymer with at least one resin selected from a group of resins consisting of a polysaccharide and an acrylic resin.

2. The liquid detection sensor according to claim 1, wherein each resin-made bag is disposed between the positive electrode and the negative electrode.

3. The liquid detection sensor according to claim 1, wherein each electrolytic solution-forming component comprises water, an alkaline metal salt, or an aqueous solution of an alkaline metal salt.

4. The liquid detection sensor according to claim 1, wherein an active material of the negative electrode comprises at least one metal selected from the group consisting of magnesium (Mg), aluminum (Al), lithium (Li), calcium (Ca), and zinc (Zn).

5. The liquid detection sensor according to claim 1, having a notifying unit that receives electric power of the metal-air battery and notifies detection of a liquid.

6. The liquid detection sensor according to claim 1, having a notifying unit capable of wireless signal transmission of a detection signal of the metal-air battery to a signal receiving unit.

7. The liquid detection sensor according to claim 1, wherein the liquid detection sensor is a water detection sensor.

8. The liquid detection sensor according to claim 1, wherein the liquid detection sensor is an oil detection sensor.

9. The liquid detection sensor according to claim 1, wherein each resin-made bag comprises the water-soluble resin composite.

10. The liquid detection sensor according to claim 1, wherein each resin-made bag comprises the oil-soluble resin.

11. The liquid detection sensor according to claim 1, wherein each electrolytic solution-forming component enclosed in the inside of an associated resin-made bag comprises an alkaline metal salt or an aqueous solution of an alkaline metal salt.

12. The liquid detection sensor according to claim 1, wherein each resin-made bag comprises the water-soluble resin composite, which comprises a first layer including the polyvinyl alcohol-based polymer, and a second layer including the polysaccharide and/or acrylic resin.

* * * * *